March 17, 1959 — L. L. MAUS — 2,877,901
FILTERING APPARATUS
Filed July 12, 1955 — 4 Sheets-Sheet 1

INVENTOR.
Lawrence L. Maus,
BY
Parker, Crochnow & Farmer,
Attorneys.

March 17, 1959 — L. L. MAUS — 2,877,901
FILTERING APPARATUS
Filed July 12, 1955 — 4 Sheets-Sheet 3

INVENTOR.
Lawrence L. Maus,
BY Parker, Brockman & Haines,
Attorneys.

March 17, 1959
L. L. MAUS
2,877,901
FILTERING APPARATUS
Filed July 12, 1955
4 Sheets-Sheet 4
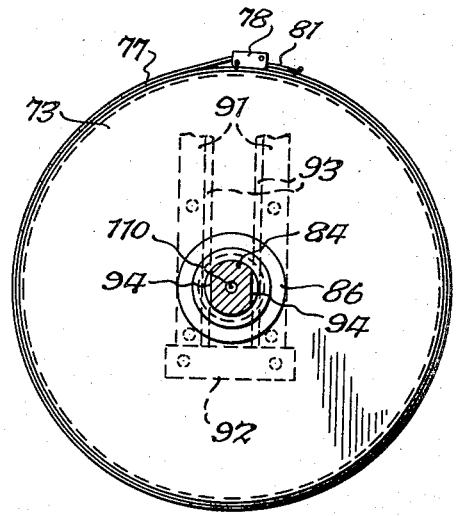
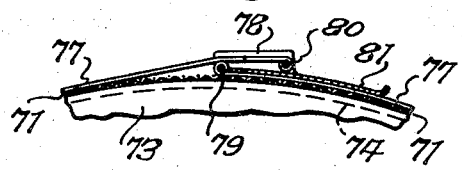
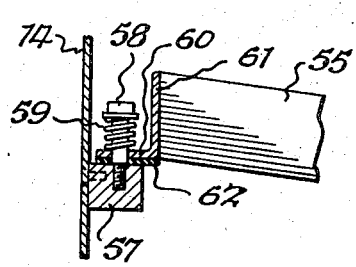
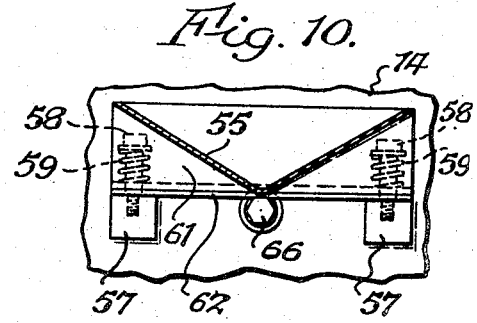
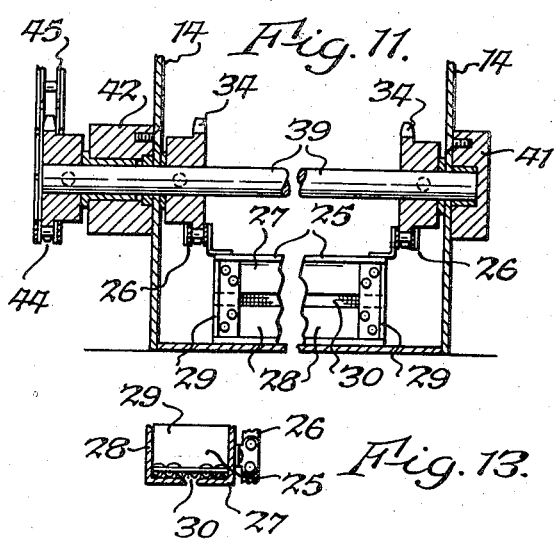
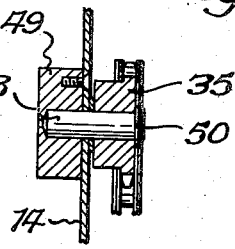
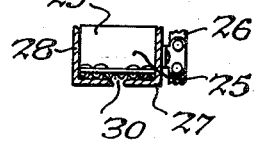
INVENTOR.
Lawrence L. Maus,
BY
Parker, Crochnow & Ternett,
Attorneys.

United States Patent Office 2,877,901
Patented Mar. 17, 1959

2,877,901

FILTERING APPARATUS

Lawrence L. Maus, Buffalo, N. Y.

Application July 12, 1955, Serial No. 521,459

6 Claims. (Cl. 210—391)

This invention relates to improvements in filtering apparatus of the type employed for removing solid matter from liquids.

The filtering apparatus forming the subject matter of this invention is primarily intended for removing chips and other solid matter from the coolant used in metal working machines for cooling the cutting tool and the work which is being cut. It will be understood, however, that it is not intended to limit this invention to apparatus of this type, since it will be obvious that the apparatus shown may be employed for other purposes.

One of the objects of this invention is to provide a filter of this type which includes a settling chamber in which larger or heavier particles may be removed from the liquid and a screen by means of which finer particles are removed from the liquid, and in which means are included for continuously removing the precipitated particles from the settling chamber and for clearing the screen. Another object is to provide a filter of this type with means of improved construction for mounting a revolving screen in the settling chamber. A further object is to provide air or liquid blast means within the revolving screen which serve to remove from the screen particles of material which have become lodged thereon. Another object is to provide improved means for scraping the heavier particles from the settling chamber and depositing them on a vibrating conveyor from which they are discharged from the filter.

Other objects and advantages will be apparent from the following description of one embodiment of the invention and the novel features will be particularly pointed out hereinafter in connection with the appended claims.

In the accompanying drawings:

Fig. 6 is a sectional elevation thereof, on line 6—6, Fig. 4.

Fig. 7 is a fragmentary sectional elevation, on an enlarged scale, showing the mechanism for securing screening material on a screening drum.

Figure 3:
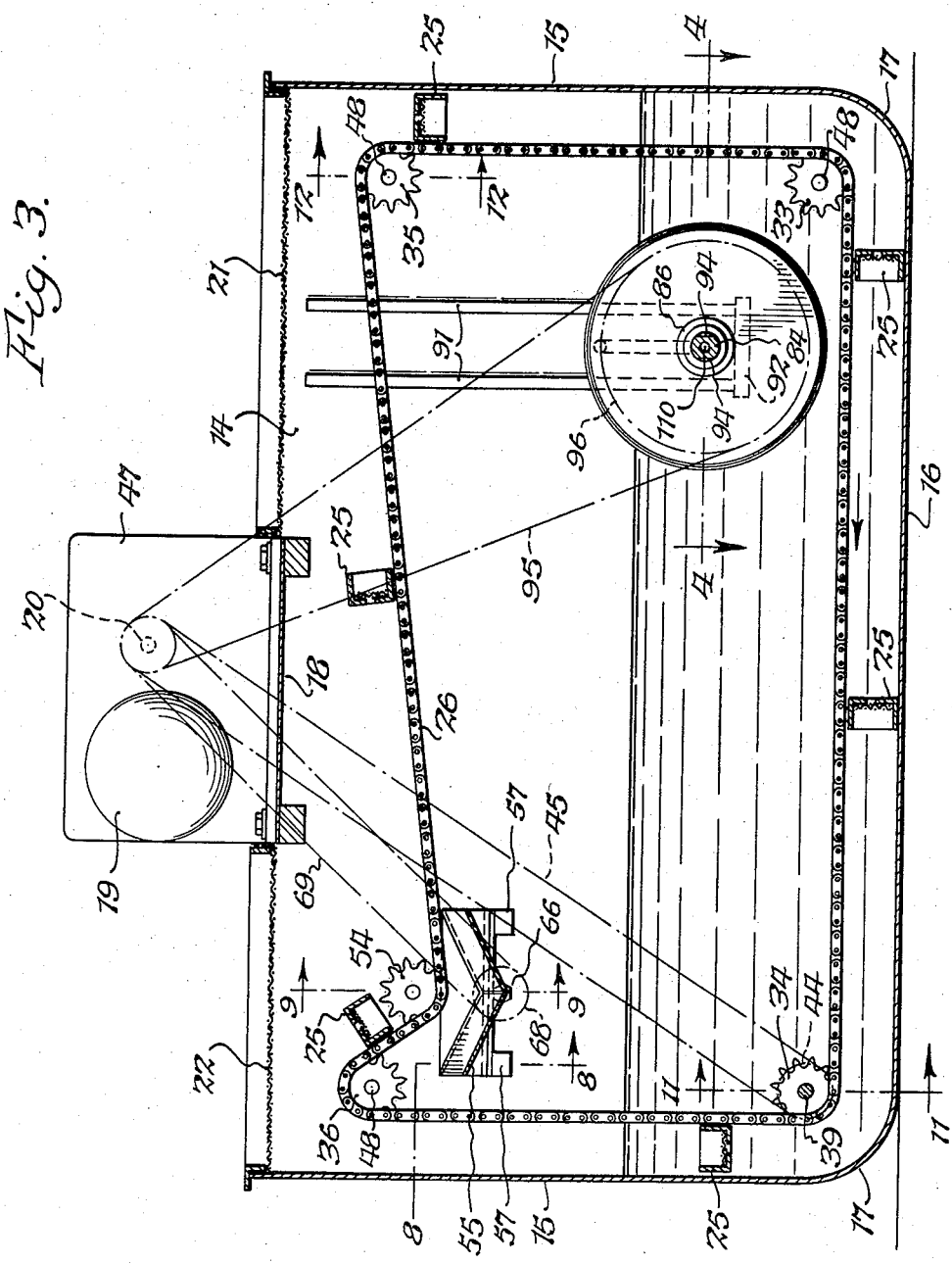
Fig. 3 is a longitudinal sectional elevation thereof, on an enlarged scale, on line 3—3, Fig. 1.

Figs. 8 and 9 are fragmentary sectional elevations thereof, on lines 8—8 and 9—9 respectively, Fig. 3.

Fig. 10 is a fragmentary longitudinal sectional elevation thereof showing the trough by means of which material is removed from the apparatus.

Figs. 11 and 12 are fragmentary sectional elevations thereof, on lines 11—11 and 12—12 respectively, Fig. 3.

Fig. 13 is a fragmentary transverse sectional view of one of the movable troughs for removing material from the bottom of the settling chamber.

My improved filtering apparatus includes a settling tank or container which is preferably rectangular in cross section and which may be constructed, preferably of sheet metal, in any suitable or usual manner. This tank includes side walls 14 and end walls 15, the end walls being integral with the bottom 16 of the tank in the construction shown, and being connected to the bottom by means of rounded or curved porions 17. This tank contains most of the filtering apparatus and is provided with a transversely extending top portion or bridge 18 on which a motor 19 is mounted, which drives a shaft 20 through suitable gearing (not shown). At opposite ends of this bridge, removable cover members 21 and 22 are provided to afford access to the interior of the tank. These covers 21 and 22 may be in the form of suitable frames having screening material attached thereto. The liquid to be filtered may be conducted into the tank in any suitable or desired manner, preferably by means of a conduit which may be arranged in any suitable or desired position to discharge liquid to be filtered into the tank, the termination of the inlet at the tank being located in accordance with the particular installation of the filtering apparatus and may ener any wall of the tank or the liquid may be discharged into the tank through the screening forming parts of the covers or lids 21 and 22.

The tank forms a settling chamber for the liquid to be filtered. The heavier and larger particles of materials entering the tank will, consequently, become deposited on the bottom 16 of the tank, from which they are removed by suitable scrapers or buckets. These scrapers may be constructed in any suitable or desired manner, and in the construction shown, the removal of the precipitated particles is effected by means of a plurality of scrapers 25 supported at their ends by endless chains 26 which move the scrapers in an endless path. These scrapers are of sufficient length to extend across the greater part of the width of the tank and are moved along the bottom of the tank to scoop up material deposited thereon. These scrapers or buckets are approximately in the shape of elongated open rectangular boxes and as shown in Fig. 11, may be formed of a pair of angle-shaped members or bars 27 and 28 spaced apart to form slots or open spaces in their bottoms and connected at their ends in any suitable manner, for example, by means of angle-shaped end walls or pieces 29. A strip of screening material 30 is secured to the bottom of each scraper or bucket to extend across the space or slot between the bars 27 and 28. Consequently, liquid may flow through the screening material 30 and these slots, so that only solid particles are retained in the buckets or scrapers when they pass out of the liquid in the tank.

Figure 1:
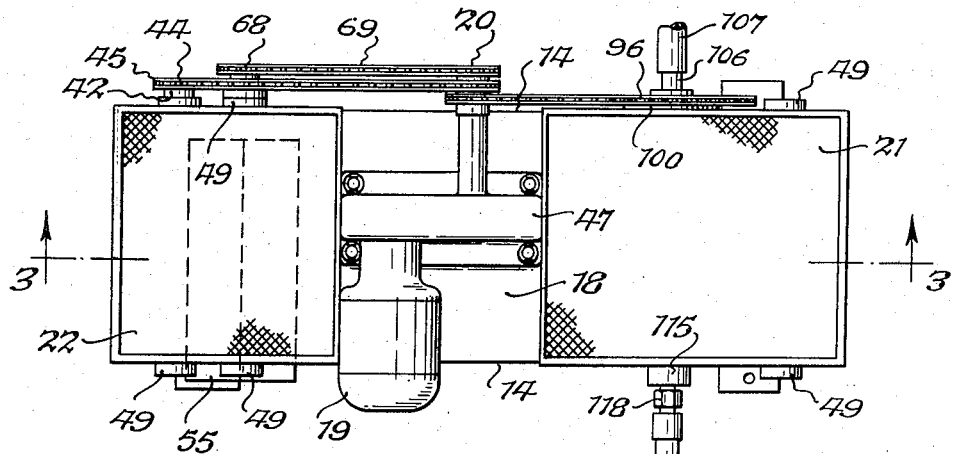
Fig. 1 is a top plan view of the filtering apparatus embodying this invention.
Figure 2:
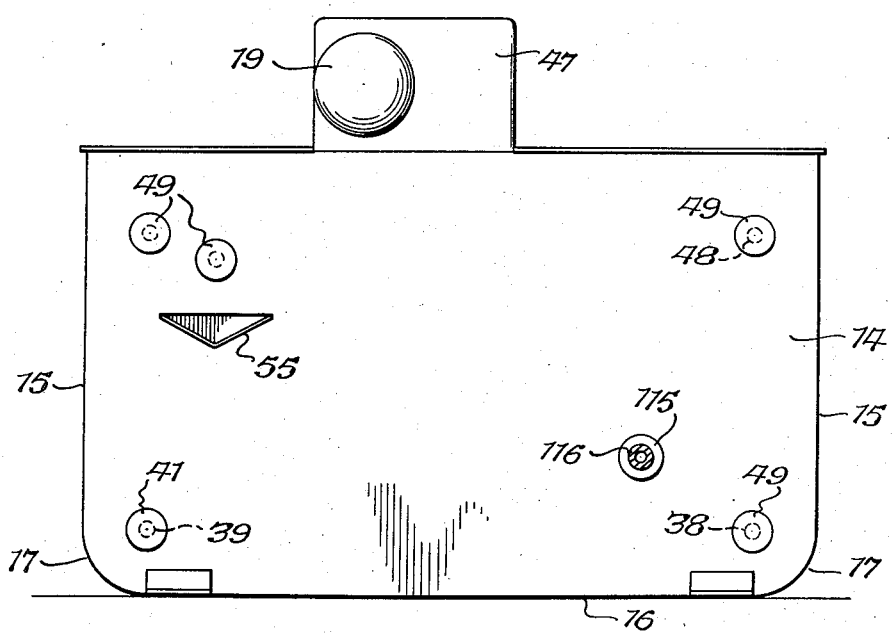
Fig. 2 is a side elevation thereof.

The chains 26 to which the opposite end portions of the scrapers or buckets are secured are guided by means of a pair of sprocket wheels 33 and 34 arranged adjacent to the ends and near the bottom of the tank, and upper sprockets 35 and 36. The sprocket wheels 34 are mounted on a shaft 39 which extends crosswise of the tank. The shaft 39 is driven to impart movement to the chain 26 through the sprockets 34 and, consequently, this shaft is journalled at one end thereof in a bearing 41 secured to a side wall of the tank and at the other end in a bearing 42 through which the shaft 39 extends, see particularly Fig. 11. This bearing may be provided with any suitable or desired means to prevent liquid from leaking out of the tank, and this shaft 39 is provided on the end thereof of exterior to the tank with a sprocket 44 which cooperates with a driven sprocket chain 45 which imparts rotation to the shaft 39 and, consequently, causes the sprocket chains 26 within the tank to move in the direction of the arrow shown in Fig. 3. The chain 45 is driven by a sprocket mounted on the shaft 20, which in turn is driven by means of the motor 19 through suitable speed-reducing means arranged within a housing 47, Figs. 1, 2 and 3. Any other means for imparting movement to the sprocket chains 26 within the tank may be provided, and consequently, it will be seen that when the lower part of this chain moves in the direction of the arrow in Fig. 3, the buckets or scrapers 25 will move along the bottom wall 16 of the tank, and consequently, particles of material which have settled out of the liquid will be picked up by the scrapers or buckets 25 and carried upwardly along the left end of the tank, as shown in Fig. 3.

The sprockets 33 and the upper sprockets 35 and 36 may be mounted for rotation about studs 48 suitably secured to opposite side walls of the tank, for example, by means of blocks 49, Fig. 12, mounted on the exterior of the tank. These studs have removable retainers 50 which retain the sprocket wheels on the studs.

Suitable means are provided for continuously emptying the scrapers or buckets 25 and also removing the material picked up by these buckets from the tank.

In the construction shown for this purpose, the chains 26 after passing over the sprocket wheels 36 are caused to travel downwardly and thus invert the scrapers or buckets 25. This downward dip in the chains 26 may be effected by means of a pair of sprocket wheels 54, see Fig. 3, which are mounted on studs secured to the side walls of the tank in the same manner as those described in connection with the sprocket wheels 35 and 36. It will thus be seen in Fig. 3 that the contents of the buckets when they pass downwardly over the portion of the chain between the sprocket wheels 36 and 54 will be inverted sufficiently to dump the contents of the scrapers or buckets into a suitable trough 55, positioned to receive the material dumped from the scrapers or buckets.

The trough 55 is arranged crosswise of the tank and slopes downwardly from one side thereof to the other. One end of the trough may be supported on one side wall of the tank in any suitable manner, for example as shown in Figs. 8 to 10, the higher end of the trough may be supported on a pair of blocks 57 secured to the inner surface of the adjacent side wall of the tank. This end of the trough is held in place on the blocks 57 by means of bolts 58, which permit up and down movement of this end of the trough. Preferably, springs 59 are employed which act against the heads of the bolts 58 and bear against a flange 60 forming a part of an angle bar 61, the other flange of which forms the upper end wall of the trough 55. 62 represents a sheet or pad of rubber or other resilient material which may be secured under the flange 60, to reduce noise.

The material deposited on the trough 55 is removed therefrom by suitable vibrating mechanism. In the construction shown for this purpose, I have provided a shaft 64 which is arranged in a bearing 65 secured to the outer surface of a side wall 14 of the tank, approximately midway between the two supporting blocks 57. The shaft extends through a hole in the tank side wall and a suitable cam or vibrating member 66 is arranged on the inner end of this shaft. This member 66 may be of any suitable shape, that shown being of approximately hexagonal cross section. The cushion or pad 62 rests on this cam member 66 and as this member is rotated by the shaft 64, it will be obvious that the higher end of the trough will be raised by the cam member 66 and then lowered by gravity and by the springs 59, thus imparting sufficient vibration to the cam member to cause the particles deposited thereon to move lengthwise of the trough to the opposite side of the tank at which the other side wall 14 is provided with an opening through which the trough extends. The material separated by gravity from the liquid is, consequently, discharged from the tank and dropped from the outer end of the trough.

The vibrating shaft 64 may be rotated in any suitable manner. In the construction shown, see Fig. 9, a sprocket 68 is mounted on the outer end of the shaft 64 and cooperates with a chain 69 which is also driven from another sprocket mounted on the shaft 20 driven by the motor 19.

The liquid from which the larger particles of material have been removed by settling on the bottom of the tank is then passed through a suitable strainer, screen or filter which is also arranged within the tank. This filter in the particular construction illustrated by way of example is in the form of a cylinder or drum, the outer periphery of which is formed by a sheet of screening or filtering material 71 which may be supported in approximately cylindrical form in any suitable manner, for example, by means of a supporting frame of approximately squirrel-cage form having imperforate end walls 72 and 73 provided with flanges 74 extending toward each other, the flanges being connected at intervals by means of cross bars 75. The straining or filtering material 71 which may be of a fine mesh fabric, such for example as nylon, or of a wire mesh material, is suitably clamped to the flanges 74 of the end walls. Any suitable clamping means may be used for this purpose, such for example as metal bands 77, the ends of which may be connected by suitable means for drawing the bands tightly about the edge portions of the screening material 71 which overlies the flanges 74. These tensioning or clamping devices may be of any suitable or desired form, such for example, as links 78 each having a cross pin 79 to which one end of a clamping band 77 may be secured and another pin 80 to which the other end of the clamping band is secured. The link 78 is provided with an outwardly extending handle portion 81. When these several parts are in the positions shown in Fig. 7, the band will be tightly stretched around the flange 74 and will be held in that position by the tension of the band. When the handle portion 81 is swung upwardly from the position shown in Fig. 7, the tension of the clamping band 77 will be released so that the screening fabric 71 may be removed from the flanges 74. The bars 75 assist in holding the fabric 71 in approximately cylindrical form.

The filtering drum is rotatably mounted on the side walls 14 of the tank and is provided with means for withdrawing liquid from the interior thereof, the liquid from the tank flowing through the filtering fabric into the interior of the drum before it is discharged from the apparatus.

In the construction shown by way of example, the drum is mounted to rotate about a shaft which may be constructed in two parts 83 and 84, which are suitably secured together. The shaft part 83 is of tubular construction and is open at its outer end to discharge filtered liquid from the apparatus. The other shaft part 84, as shown, is of smaller diameter than the shaft 83 and telescopes into and closes the inner end thereof.

Figure 4:
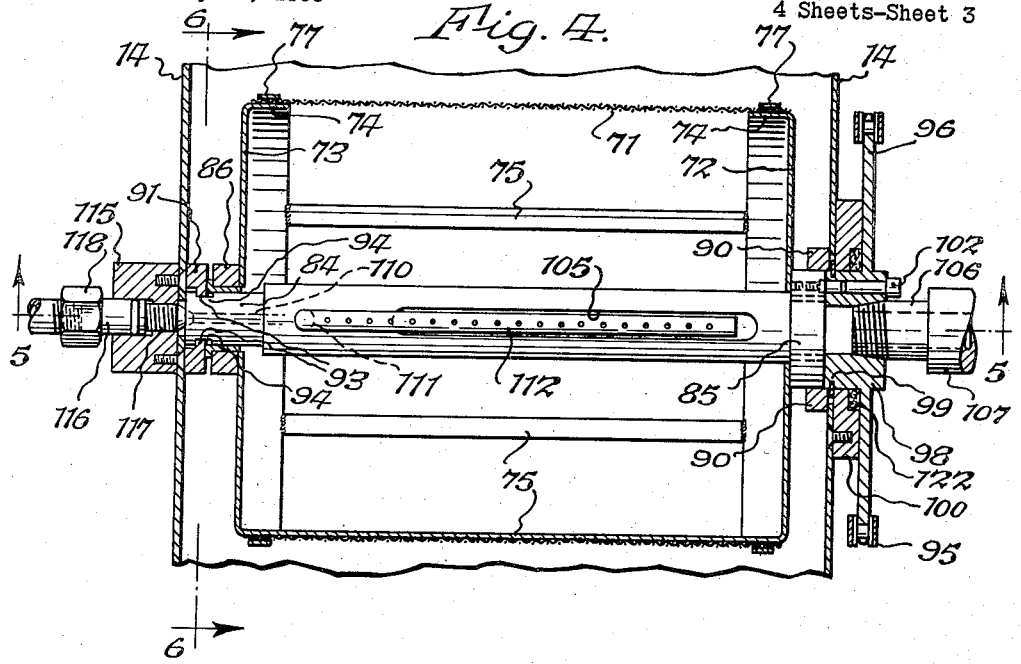
Fig. 4 is a sectional plan view thereof, on line 4—4, Fig. 3.
Figure 5:
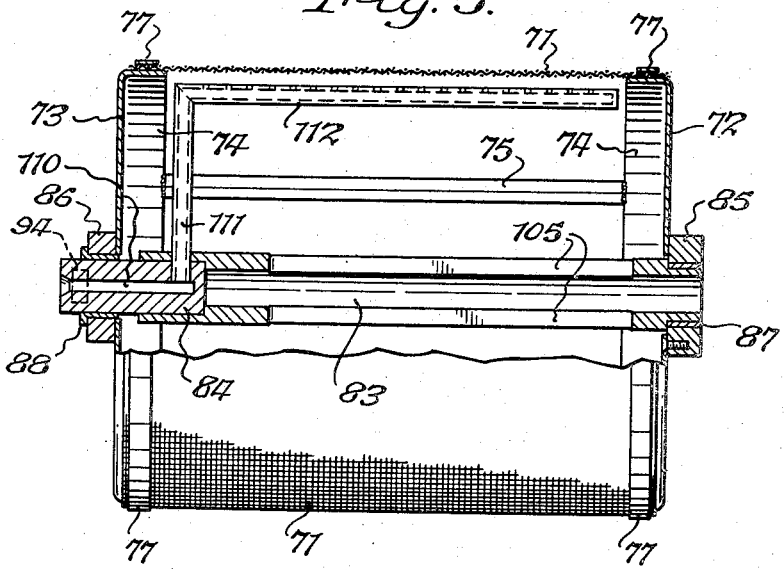
Fig. 5 is a fragmentary elevation thereof, partly in section, on line 5—5, Fig. 4.

The two end walls 72 and 73 of the drum are provided with bosses or hubs 85 and 86 respectively, suitably secured thereto and supported by means of bearings 87 and 88 on the parts 83 and 84 of the shaft, as shown in Figs. 4 and 5. Thus, it will be evident that the drum may rotate about the composite shaft.

The mounting of the shaft on the tank walls may be effected in any suitable manner. Preferably the drum is so mounted that it together with the shaft may be raised out of their operative positions in the tank. This mounting also facilitates the assembly of the drum in the tank. In the construction shown for this purpose, the opposite side walls of the tank are provided with pairs of parallel, upright guide rails 90 and 91, the rails 90 being spaced apart to receive the boss 85 of the drum, and the other rails 91 receive the part 84 of the shaft. A suitable cross member 92 is shown at the bottom of the upright rails 91 upon which the shaft 84 may rest when in its lowest position, and a similar stop member, not shown, is provided across the lower ends of the guide rails 90. The guide rails 91 are also provided with flanges 93 extending toward each other for cooperation with two flattened parts 94 of the shaft 81. Consequently, the flanges cooperating with these flattened parts hold the shaft against turning but permit the same to be moved up and down between its guide rails. These flanges and flattened parts of the shaft also position the shaft in the direction of its length and hold the same against axial movement.

The screening drum is rotated on the shaft when the apparatus is in operation, and this rotation is preferably accomplished by means of a sprocket chain 95 cooperating with a sprocket wheel 96. This chain also receives power from another sprocket mounted on the shaft 20 driven through the reduction gear by the motor 19. This sprocket wheel has a hub 98 and this hub is retained in correct rotary relation to the side of the tank by means of a retaining ring 99 suitably held against axial movement relatively to the tank wall and extending into an annular groove or recess in the periphery of the hub of the sprocket wheel 96. For example, this retaining ring may be held in place on the side wall 14 of the tank by means of a sprocket housing or bearing member 100 which is suitably secured by means of screws or otherwise to the side wall 14 of the tank. The sprocket wheel 96, therefore, is rotatably mounted on the side wall of the tank and may be connected with the hub 85 of the tank in any suitable manner, such for example as a plurality of shouldered screws 102 which extend through holes in the hub of the sprocket wheel and have threaded ends suitable for engagement in threaded holes in the hub 85 of the drum, Fig. 4. Consequently, when these shouldered screws 102 are secured to the hub 85 of the drum, then rotation of the sprocket wheel will be trancsmitted to the drum.

The filtered liquid is withdrawn from the interior of the drum through the hollow shaft 83 which, for that purpose, is provided with slots or other openings 105 through which the liquid may enter into the shaft. The hub of the sprocket wheel is also hollow and is connected with a discharge tube 106 suitably connected with a swivel joint 107. Consequently, liquid may be withdrawn from the drum through the hollow shaft part 83, through the hub of the sprocket wheel tube 106 and swivel joint 107. The construction described makes it possible by means of the screws 102 to simultaneously connect the driving means with the straining drum and also connect the discharge tube 106 with the hollow shaft. Since this shaft is ordinarily submerged in the liquid in th etank, as clearly shown in Fig. 3 this liquid may flow out of the drum by gravity.

I have also provided means for removing from the screening material 71, such as particles of undesired material which have not been precipitated in the tank and which may adhere to the exterior surface of the screening material 71 and interfere with the passage of liquid through the same. This is effected by directing currents of fluid against the interior surface of the screening material, preferably against a portion of the drum which is above the body of liquid in the tank. This blast of cleaning fluid directed against the inside of the screen may be air, or if desired, it may be some of the liquid which has been filtered.

In order to supply such cleaning fluid to the interior of the drum, I have in the particular construction shown provided the shaft part 84 with an axially extending hole or bore 110. Connected wtih this bore is a radially extending tube 111 which terminates at its outer end in a perforate tube 112 which is so arranged that the perforations or discharge nozzles of this tube are in proximity to the inner surface of the screen 71. Consequently, when air or other cleaning liquid under pressure is admitted into the hole or bore 110, it will be projected outwardly through the perforations in the tube 112 against the inner surface of the screen and will thus dislodge particles which have become deposited on the screen.

The transmission of cleaning fluid to the bore or passage 110 in the shaft part 84 may be effected in any desired manner, and in the construction shown for this purpose, I have secured on the outer surface of the adjacent side wall of the tank a boss 115 which has a threaded aperture which cooperates with a hollow stud 116 having a screw-threaded part 117. This stud is also provided with a tapered end formed to fit in a tapered recess at the end of the passage or bore 110 in the shaft part 84. The stud also has a hollow head 118 which may be turned to seat the tapered end of the stud 116 in the tapered recess at the outer terminal of the bore or passage 110 when the strainer drum is in its lowered position to form an approximately airtight connection with said passage. The head 118 of the stud may connect with any suitable inlet duct for the cleaning fluid.

When the parts are in the position shown in Fig. 4, cleaning air or other gas, or filtered liquid of the type under treatment in the apparatus may be passed to the spray pipe 112 within the screen drum, and at the same time filtered liquid may be removed from the apparatus while the same is rotating. When it is desired to remove the drum from its operative position in the tank, it is merely necessary to unscrew the sprocket gear hub from the hub 85 of the drum and also to back off the intake stud 116 so that it will be out of the path of upward movement of the drum along the rails 90 and 91. This mounting of the screening drum has the further advantage that when the drum is raised upwardly out of its operative position, no liquid will escape from the tank. For example, an oil or liquid seal 122 may be provided between the sprocket housing or bearing member and O-rings, or other packing devices may be used wherever necessary to prevent leakage of the liquid out of the tank.

The filtering apparatus described has the advantage that it is self-cleaning so far as the removal of chips or larger particles of material by the scrapers or buckets is concerned, and the screening material may be cleaned whenever necessary by admitting a cleaning fluid to the spray pipe 112. The material blown off of the exterior of the screen will, in most cases, settle to the bottom of the tank from where it will be removed by the scoops or scrapers.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A liquid filtering apparatus including a tank into which liquid to be filtered is admitted, a strainer drum having a web of straining material extending about the periphery thereof and partly submerged in the liquid in said tank to permit liquid to pass through said straining material into the interior of said drum, a non-rotatable shaft about which said drum is rotatable, driving means for said drum mounted on the exterior of said tank and rotatable about an axis fixed with relation to said tank, guides arranged within said tank along which said drum and said shaft may be moved upwardly when disconnected from said driving means, means connecting said drive means with said drum when said drum is in its operative position in said tank, and means for stopping downward movement of said drum on said guide means when said drum is in correct relation for securing to said drive means.

2. A liquid filtering apparatus according to claim 1, characterized in that said shaft is hollow and has openings communicating with the interior of the shaft, and conduit means on the exterior of said tank connectable with said hollow shaft when in position for connection with said drive means and through which filtered liquid may be withdrawn from the interior of said drum.

3. A liquid filtering apparatus according to claim 1, said guide means including means for preventing rotation of said shaft while in engagement therewith.

4. A liquid filtering apparatus according to claim 1, in which said shaft has a passage formed in one end thereof for admission of a cleaning fluid, a spray pipe connected with said passage for spraying cleaning fluid against the inner surface of said straining material to remove foreign material adhering to the outer surface thereof, a conduit on the exterior of the apparatus positioned for supplying cleaning fluid to said passage and movable into substantially fluid-tight relation to said shaft when said drum is held by said stop means in its lowered position.

5. A liquid filtering apparatus including a tank into which liquid to be filtered is admitted, a strainer drum having a web of straining material extending about the periphery thereof and partly submerged in the liquid in said tank to permit liquid to pass through said straining material into the interior of said drum, a shaft about which said drum is rotatable, driving means for said drum mounted on the exterior of said tank, guides arranged within said tank along which said drum and said shaft may be moved upwardly for removal from said tank, cooperating parts on said guides and said shaft to hold said shaft against turning, stop means for determining the lowest position of said shaft and drum, said shaft being hollow and having openings therein to receive liquid from the interior of said drum and to discharge the same from an end thereof, parts on the exterior of said tank connectable with said end of said shaft to receive liquid from said drum, and means for simultaneously connecting said drive means with said drum and said parts with said end of said shaft when said shaft is in its lowest position.

6. Filtering apparatus including a tank into which liquid to be filtered is admitted, a strainer drum rotatably mounted in said tank and partly extending below the liquid level therein, a web of straining material extending about the periphery of said drum through which liquid from said tank may pass into the interior of said drum, a hollow stationary shaft about which said drum revolves and which is divided intermediate of its ends into two non-communicating parts, a passage for cleaning liquid arranged in one end of said shaft, a spray pipe connected with said passage and extending in close proximity to said straining material in the interior of said drum, detachable connections for admitting cleaning fluid from the exterior of said apparatus to said passage and in said one end to said spray pipe for projecting cleaning fluid against the interior of said straining material to remove foreign matter from the outer surface thereof, the other part of said hollow shaft having an opening for receiving liquid from the interior of said drum, a discharge passage in the other end of said shaft through which filtered liquid may pass, and parts on the exterior of said tank and connecting with said shaft to discharge filtered liquid from said drum.

References Cited in the file of this patent

UNITED STATES PATENTS

| | | |
|---|---|---|
| 184,427 | Riddle | Nov. 14, 1876 |
| 993,839 | Keyes | May 30, 1911 |
| 1,516,693 | Anthony | Nov. 25, 1924 |
| 1,554,943 | Antoine | Sept. 22, 1925 |
| 1,840,848 | Richards | Jan. 12, 1932 |
| 2,191,122 | Semelser | Feb. 20, 1940 |
| 2,336,710 | Wied | Dec. 14, 1943 |
| 2,494,534 | Armstrong et al. | Jan. 17, 1950 |
| 2,559,614 | Hapman | July 10, 1951 |
| 2,660,310 | Hapman | Nov. 24, 1953 |
| 2,715,964 | Martin | Aug. 23, 1955 |